United States Patent [19]
Keiley, deceased et al.

[11] 3,958,396
[45] May 25, 1976

[54] LAWN MOWER REEVING SYSTEM

[76] Inventors: John A. Keiley, deceased, late of Atlanta, Ga.; Alice R. Keiley, temporary administratrix, 55 W. Belle Isle Road NE., Atlanta, Ga. 30342

[22] Filed: June 21, 1974

[21] Appl. No.: 481,833

[52] U.S. Cl.............................. 56/7; 56/10.5
[51] Int. Cl.² .................................. A01D 75/28
[58] Field of Search .......... 56/10.5, 15.5, 7, DIG. 7, 56/10.8, 11.4, 11.5; 242/54 R

[56] References Cited
UNITED STATES PATENTS
2,483,762   8/1949   Ebenhoe .................................. 56/7
3,651,623   3/1972   Harley ................................. 56/15.5

Primary Examiner—Hugh R. Chamblee
Assistant Examiner—James D. Hamilton
Attorney, Agent, or Firm—Thomas A. Turner, Jr.

[57] ABSTRACT

A ground working implement control system having a stationary operating station and a moving ground working station is described having a control clutch arrangement operable at the stationary operating station, for controlling through connection cables the directional movement of the ground working station.

3 Claims, 6 Drawing Figures

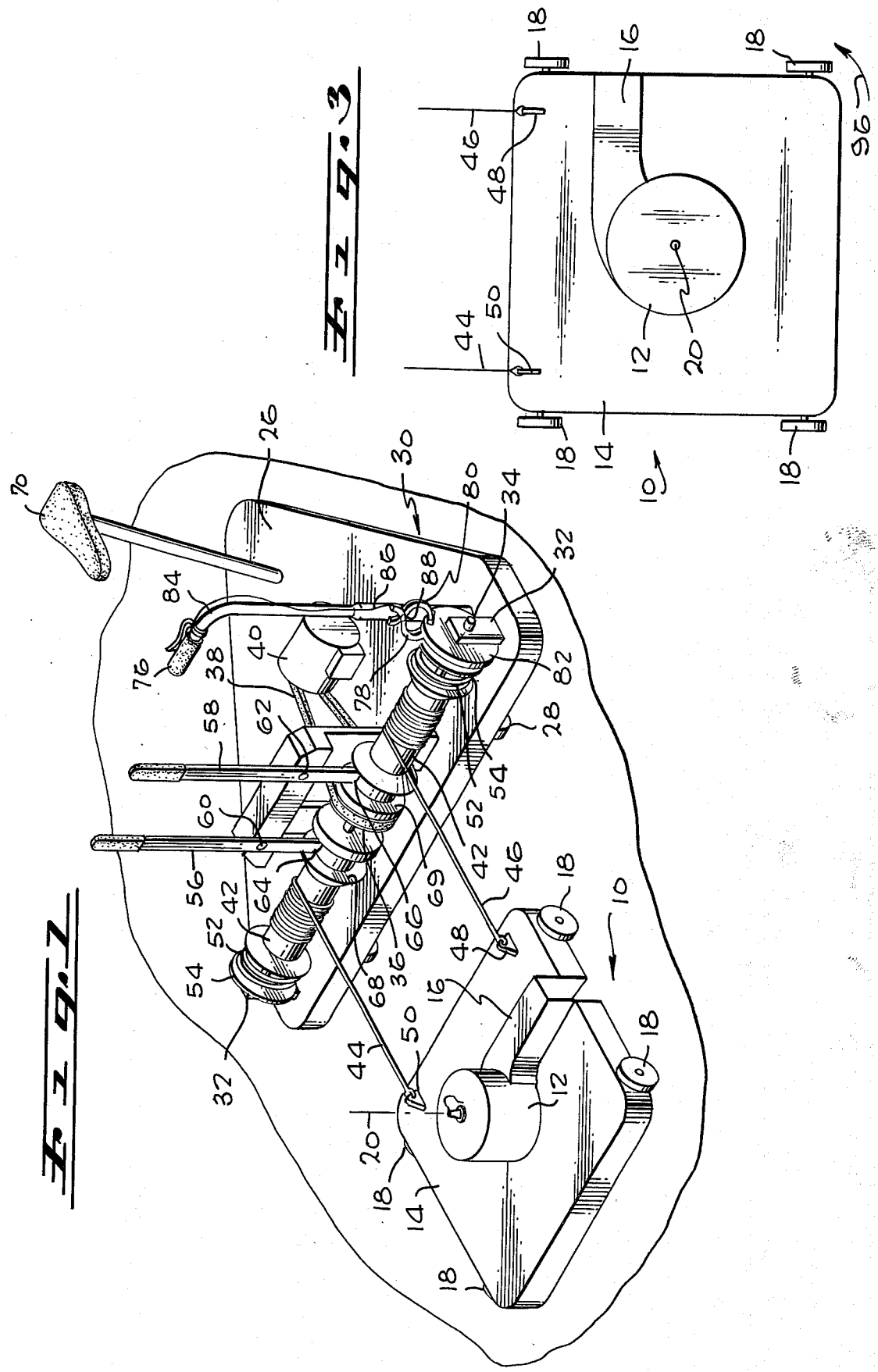

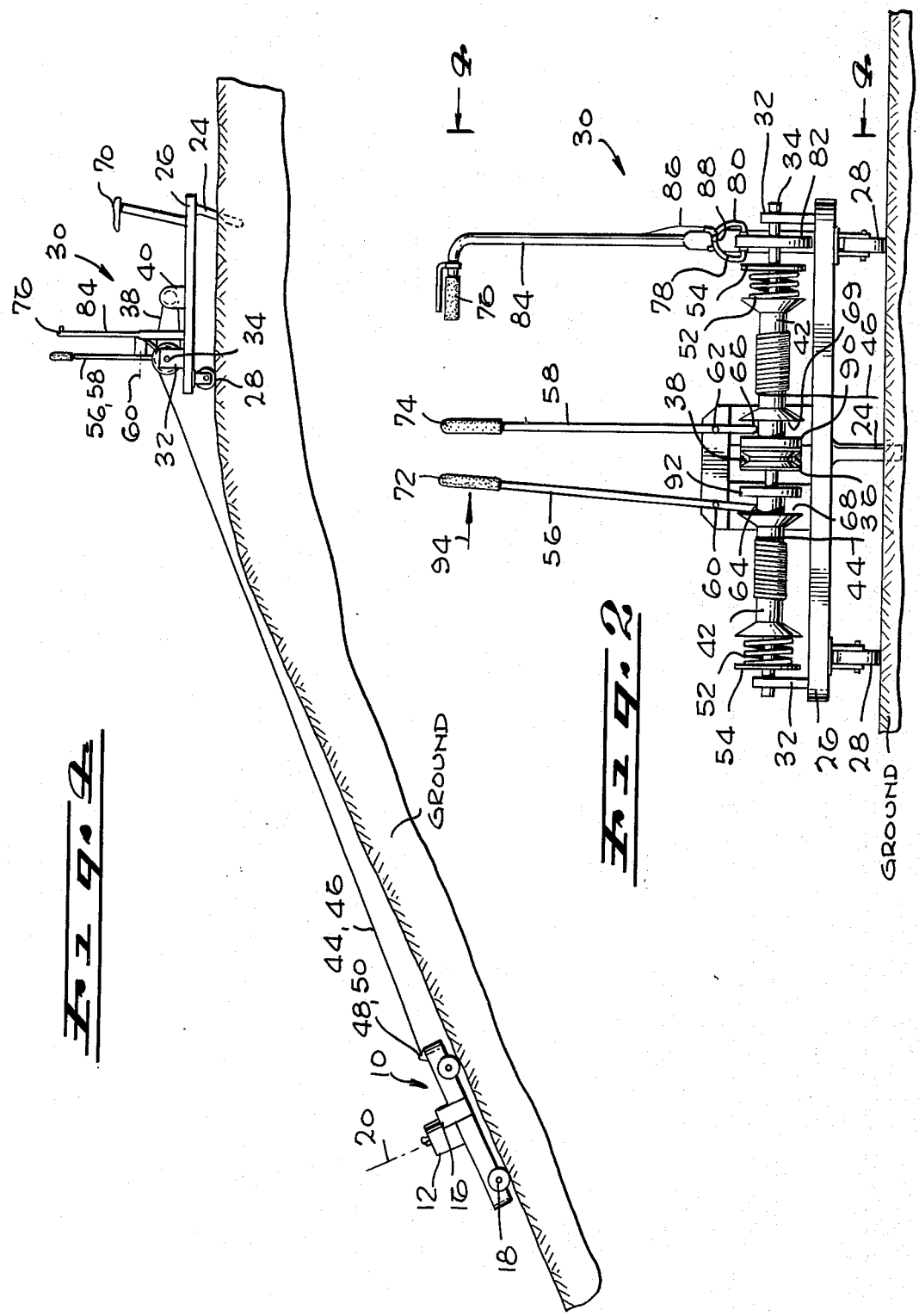

LAWN MOWER REEVING SYSTEM

BACKGROUND OF THE INVENTION

It has been known before to construct a ground working apparatus which is attachable to such a tractor such that the implement can be controlled in direction by cables between the tractor and the attached implement. In this regard, attention is called to Wise, U.S. Pat. No. 1,242,505.

It has not been known or taught before, moreover, to construct an apparatus which is attachable to an independently powered truck or tractor for controlling a ground working implement remotely from the truck, wherein the operator remains.

It has been known before also to construct independently powered, operable lawn mowing instruments, and similar type ground working instruments Oftentimes, it is undesirable for one reason or another for an operator operating such instruments to be physically close to such an instrument, as is required in lawn mowing instruments which must be pushed or pulled. Thus, many lawn mowing devices have been invented and produced which operate independently of constant operator supervision. Most of these devices, however, operate on some mechanical, electrical or optical sensing means which sense boundaries such as tall grass, walls and the like. Thus, once such an instrument is started the device follows a predetermined path until a mission is completed. In the meantime, the operator can remove from the premises.

Devices attachable to an independently powered truck have been known, also. In many cases such devices are ground working or farm implements. Such as implement frequently is constructed so as to be attached by a hitch to a tractor or other similar, independent power source.

In many applications of independently operated ground or grass working instruments, the ground or grass working instrument must follow a path on relatively level terrain. Any terrain which becomes excessively hilly, or terrain which is marked by bolders, holes, or other features which the sensing elements of such a device cannot detect, individual operator supervision is required in close proximity to the device. Furthermore, oftentimes it is desired to maneuver such devices as a lawn mower into areas where an operator cannot follow comfortably in such close proximity.

Hereafter in this description, the term truck and tractor shall be used synonymously to indicate a selectively movable, semi-permanent station from which an operator may control a device capable of movement independent of the truck or tractor.

SUMMARY OF THE INVENTION

A ground working implement control system is illustrated and described for remote control of a ground working section operated at a distance from a stationary control station. The ground working section is attached by cables to the stationary control station by controlled spools on the stationary station which reeve the cables. The spools are selectively controlled by a clutch arrangement. Controllable motor means drive the shaft of these spools. The stationary station consequently is capable of selective directional movement about the ground.

BRIEF DESCRIPTION OF THE DRAWINGS

FIG. 1 illustrates a perspective view of a preferred embodiment of the invention;

FIG. 2 illustrates a front end elevational view of a preferred embodiment of the invention;

FIG. 3 illustrates a plane view of one portion of the invention;

FIG. 4 illustrates a side elevational view taken along line 4—4' of FIG. 2, showing the preferred embodiment of the invention in one mode of operation.

DESCRIPTION OF THE PREFERRED EMBODIMENTS

Figure 5:
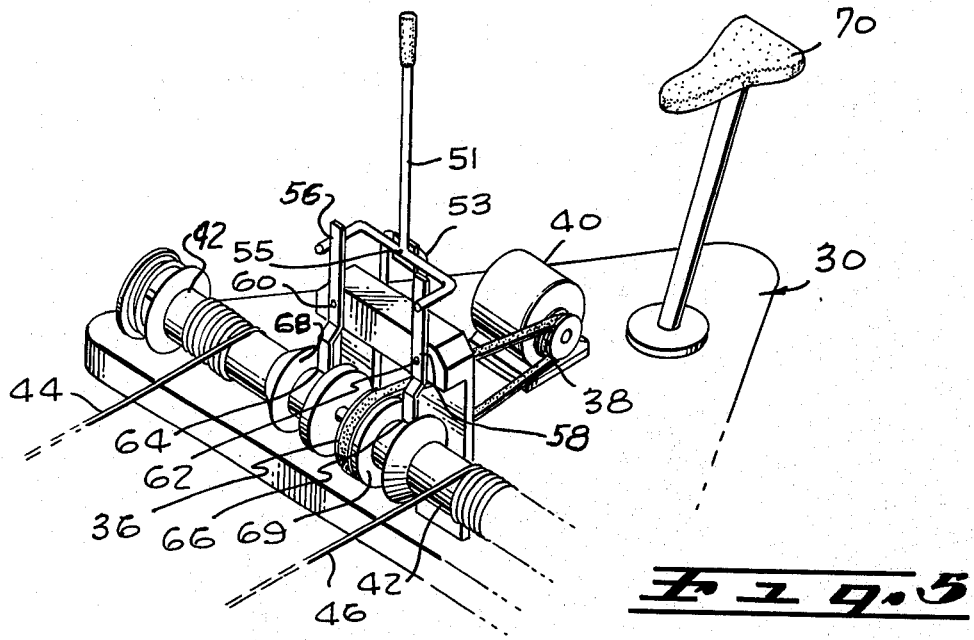
FIG. 5 illustrates a perspective view of a second preferred embodiment of the invention.

In order to overcome the aforementioned problems, an apparatus in the nature of a lawn mower is herein described, reference being had to the perspective view of my apparatus as seen in FIG. 1. A conventional lawn mower 10 is shown generally in the forefront of FIG. 1. The lawn mower 10 as shown is powered by an internal combustion engine 12 mounted upon lawn mower cover 14 and having conventional grass exhaust 16. The mower 10 is mounted upon wheels 18 in the conventional manner. The grass is cut by a blade attached to a vertical rotor shaft shown in the drawings by centerline 20. The blade is not seen in any of the views shown.

The apparatus comprises, furthermore, a truck 30 or operating station seen generally in FIG. 1, and described in greater detail herein below and seen in more detail in FIGS. 2 and 4 in the accompanying drawings. Referring now to FIG. 2, the truck is shown in front elevational view. The truck 30 can be mounted on wheels 28 as shown in the accompanying drawings. Optionally, the truck can be stationarily mounted not having wheels in the view as described. The truck is mounted upon a triangularly shaped platform 26, but could have any shape which manufacturing and marketing requirements may dictate. As shown in the preferred embodiment, a third leg 24 is shown constituting the ground support for truck 30.

Resting upon supports 32, axle or rod 34 is positioned so that it can freely rotate within the supports 32. The rod 34 is rotated by a pulley 36 fixed to the rod 34. Pulley 36 is connected by belt 38 to independently powered motor 40. Motor 40 may be electrically driven or may comprise an internal combustion engine. If desired, motor 40 may be capable of driving the rod 34 in both clockwise and counterclockwise directions upon selection by an operator. It is only necessary, in any event, that the motor 40 drive rod 34 so as to reeve or retract cables 44, 46 upon respective spools 42. The force of gravity will pull mower 10 away from truck 30, thus unwinding spools 42.

Mounted movably upon rod 34 are two spools 42 having cord 44, 46 wound thereupon. Cord 44 extends from the spool 42 to the right side of mower 10, as seen in FIG. 1, as seen by an operator sitting upon operator seat 70. In a similar fashion, cord 46 is connected around one spool 42 at one end and to the corresponding left side of the mower 10 at hooks 48 and 50.

Spools 42 are not rigidly fixed to rod 34. The spools, however, can be driven by rod 34 by a clutch assembly herein described below. The spools 42 are urged toward the center of the truck and toward drive pulley 36 by virtue of springs 52 mounted between reference plates 54 positioned on the outside of spools 42. Levers 56, 58 are mounted about pivot points 60, 62 upon the truck. The levers 56, 58 having lower ends 64, 66 which extend within annular channels 68, 69 are integrally connected to respective left and right side spools 42. The opposite end of levers 56, 58 extend upwardly so as to be operable by a human operator engaging handles 72 and 74. Preferably, the handles should be within easy reach of an operator, not shown in the drawings, sitting on operator seat 70.

The rod 34 should be equipped in the preferred embodiment by a suitable brake shown representatively in FIGS. 2 and 4. A handle 76 is shown for operation of this brake, but alternate operating brake means, such as a foot peddle may be employed. The brake as shown consists of clamping jaws 78 and 80 positioned to engage brake wheel 82 when braking is desired. Brake wheel 82 is rigidly fixed to rod 34. The jaws 78, 80 are closed so as to engage brake wheel 82 by concentric cable 84 having an inner cable 86 concentric therewith. The operation of the brake is actuated in the conventional manner by closing the peddle 76 to urge center cable 86 lontitudinally through concentric cable 84 to pivot jaws 78, 80 about pivot point 88 which is fixed.

Any conventional braking mechanism may be employed in my invention. The herein before described, hand operated cable braking system is merely given as a suitable brake arrangement.

In operation, my ground working implement is used as follows. Motor 12 actuating the blade or other ground working instrument, not shown, is actuated. The ground working instrument, such as a lawn mower 10 as shown here, is placed upon an incline, such as is representatively shown in FIG. 4 of the drawings. The motor 40 drive rod 34 is actuated.

In normal, neutral operation, both spools 44 rest in the biased position shown in FIG. 2 by the spool 42 having annular channel 69. This position is maintained by the spring 52 which urges the interiormost plate 90 of spool 42 firmly against pulley 36. The pressure exerted by spring 52 is of such strength that rotational power is transmitted from pulley 36 to the spool 42 through plate 90, as shown in FIG. 2.

If it is desired to disengage spool 42 from the rotational power pulley 36, the operator merely engages handle 72 and moves it in the direction of arrow 94. As can be seen from FIG. 2, lever 56 pivots about point 60 and engages a side of the annular channel 68. In such a manner, channel plate 92 is disengaged from the power pulley 36.

The effects of selectively engaging and disengaging the spools 42 from the power pulley 36 can then be seen. In general, the cords are respectively held stationary relative to the spool 42 or are wound or unwound upon the spool 42 depending on the direction of circular rotation of power pulley 36.

In particular, if power pulley 36 rotates in a direction such that corresponding rotation spools 42 would unwind cords 44, 46, and if the spools 42 are allowed to engage the power pulley 36 by the urgings of biasing springs 52, the ground working instrument such as a lawn mower 10 is allowed to be pulled by gravity down an incline such as is shown in FIG. 4.

If the lawn mower has reached a point beyond which the operator does not wish or desire it to go further, the levers 56, 58 can be manipulated as described above to disengage clutch plates 90, 92 from the power pulley 36. The motor 40 can then be fixed to a mode of operation so that the power pulley 36, connected to the motor by belt 38, can have its circular motion reversed by allowing plates 90, 92 to re-engage the power pulley 36. It can be appreciated that the spools 42 will be driven in such a manner that the cords 44, 46 are rewound upon their respective spools 72.

It may be desired to change the direction of the lawn mower 10 or similar type instrument from one perpendicular to the rod 34. Such a manuever can be easily accomplished by the herein described invention, without the necessity of having to move the truck 30 or to unseat the operator. Thus, if the mower is being retrieved from an extended position by virtue of winding the cords 46, 44 upon their respective spools, the operator can manipulate one of the levers, such as lever 56, but not the remaining lever, such as lever 58. In such a manner, clutch plate 92 is disengaged from power pulley 36 and the connected spool 42 to clutch plate 92 will momentarily interrupt its winding simultaneously; however, clutch plate 90 remains engaged and the attached spool 42 continues winding cord 46. The effect upon the remotely extended mower 10 is to continue retrieving the mower 10 at the hook 48. No power, it can be appreciated, acts upon the mower at hook 50. The mower, therefore, is urged in a direction shown representatively by the arrow 96 in FIG. 3 of the drawings. When the mower has misaligned itself from the directional perpendicular to rod 34 to a degree desired, the appropriate lever 56 can be released. Thereupon, spring 52 biases clutch plate 92 into re-engagement with the power pulley 36. The mower 10 can then be allowed to travel in the new misaligned direction.

By operating the levers 58, 56 in the directly opposite manner, the mower 10 can be realigned or misaligned in the opposite direction relative to the rod 34 as desired. Of course, if the motor 40 is operating in a rotational direction opposite to that in the example given above, the misalignment can be achieved by operating the opposite lever 58. The other operations, however, to be performed by the operator are the same as those described herein above.

If it is desired at any moment to instantly stop the winding or unwinding of the spools 42 such as in the case where an animal or other unexpected dangerous circumstance presents itself suddenly in the path of the mower, hand peddle 76 can be instantly depressed. As explained above, brake wheel 82 is instantly refrained from rotating, and rod 34 along with power pulley 36 are instantly braked. As described above, any other suitable braking mechanism may be employed in the practice of this invention.

Figure 6:
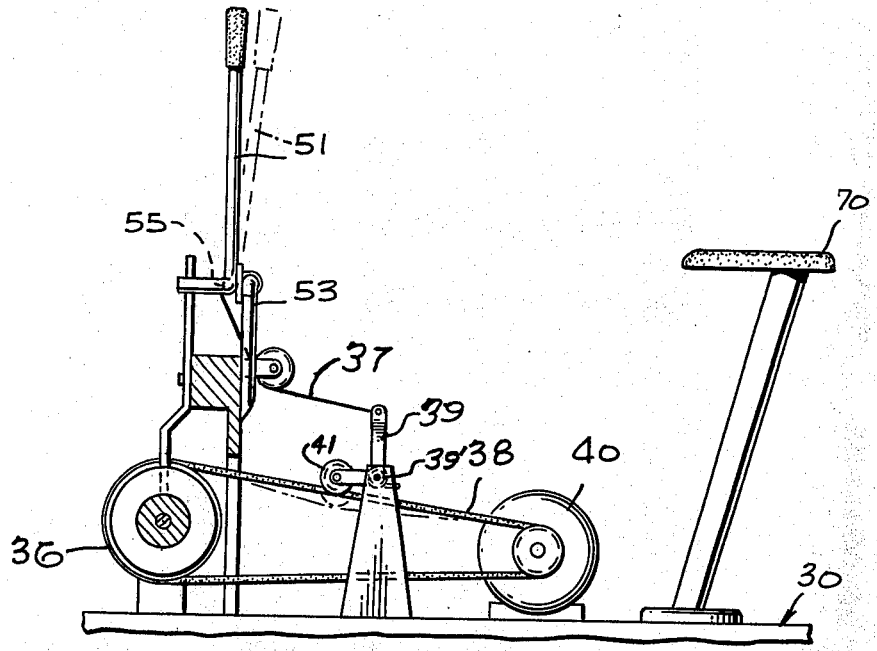
FIG. 6 illustrates a third preferred embodiment of the invention.

As alternative form of the invention is shown in FIGS. 5 and 6 of the drawings. For purposes of simplicity, similar parts unchanged in this alternative form have been given like reference numerals as found in the drawings of the preferred embodiment. Thus, drive motor 40 is shown mounted on truck 30 in the same manner as described above. Levers 56, 58 are shown pivoting about pivot points, respectively, 60, 62 on the truck 30. Lever 56 has a lower portion 64 extending within annular channel 68 and, thus, indirectly is connected to one of the spools 42. Lever 58, complementally, has lower end or portion 66 which extends within annular channel 69 and, thus, is indirectly connected to the other spool 42. Spools 42 are mounted on a rod to which pulley 36 is fixed. Belt 38 is shown threaded around pulley 36 and to the drive motor 40.

In this alternative embodiment, however, levers 56 and 58 are shown substantially shorter than as shown in FIGS. 1, 2 and 4 of the drawings. A control stick or rod 51 is shown pivotally mounted on brace 53 which is integrally connected to the frame of the truck 30. Control stick 51 can be moved about pivot point 55 to the right or left by an operator seated on seat 70 on the truck 30. As can be seen, the extended forward arms of control stick 51 will engage the upper portions of the levers 56, 58 when the control stick 51 is maneuvered so to the right or to the left. When the upper portion of lever 58 is engaged by the left-hand, forwardly extended arm of control stick 51, the lower portion 66 of lever 58 is pivoted about pivot point 62 so that lower portion 66 forces spool 42 away from drive pulley 36. Conversely, control stick 51 may be pivoted about pivot point 55 so that the right-hand, forwardly extended arm of control stick 51 engages the upper portion of lever 56. In such a manner, lever 56 will pivot about pivot point 60 forcing lower portion 64 to drive annular channel 68 and its associated spool 42 away from drive pulley 36. While this alternative embodiment allows for optionally and selectively restraining one of the cables 44, 46 wound about the spools 42, it can be seen that both spools 42 can be removed from direct, power communicating contact with drive pulley 56 simultaneously by actuating control stick 51 above.

Yet even another alternative of the invention may be seen in FIG. 5 of the drawing. Belt 38 communicating power from drive motor 40 to drive pulley 36 can be, in the normal rest mode, very slack so that rotary power from the motor shaft will not be communicated to the pulley 36. When it is desired to communicate such power to the pulley 36, cable 37 can be pulled to operate lever 39 about pivot point 39'. Cable 37 is connected to control stick or rod 51, as can be seen in both FIGS. 5 and 6. Cable 37, of course, could be left having a free end if desired. By pulling cable 37 taut, belt 38 is made taut by the downward pressure of pulley 41. If the control stick 51 can be rotated about the horizontal portion of brace 53, the belt 38 can be made taut by pulling rearwardly on the stick 51. In such a manner, power can be communicated from the motor 40 through the taut belt 38 to pulley 36.

In yet another method of communicating power to the pulley 36, the motor drive shaft can be spring-biased toward the front of truck 30, causing the belt 38 to be loose in the non-operating mode. Manually, the drive shaft could be pulled so as to make taut the belt 38.

It can be seen by the herein above-detailed description taken in view of the accompanying drawings that a relatively maneuverable ground working implement can be operated by an operator who is not required to remain in close proximity or adjacent to the ground working implement. Several alternative configurations of my invention are possible while achieving the basic structure and purpose. So, for example, a steering wheel rotatably mounted upon a steering column can be substituted for the pivoting lever operated clutch engaging and disengaging assembly described in careful detail above. As can be appreciated from conventional steering column arrangements, the steering column could be attached at the end opposite the steering wheel by well-known gearing to rod assembly capable of engaging the annular channels 69 and 68. Thus, it can be seen that the clutch plates 90 aand 92 can be selectively engaged and disengaged with power pulley 36.

I claim:

1. A ground working implement control apparatus comprising in combination:
   a. a movable automatic ground working implement capable of moving upon the ground;
   b. a control element mounted upon ground, said control element connected to said working implement by at least a first cable and a second cable;
   c. said first cable having two ends, one end fixed to substantially a first side of said movable working implement, and the other end selectively wound about a first spool rotably mounted on said control element;
   d. said second cable having two ends, one end fixed to substantially a second side of said movable working implement, and the other end selectively wound about a second spool rotably mounted on said control element;
   e. said first and said second spools being selectively rotatable individually, whereby said working element can be selectively extended from, drawn toward, and directionally turned relative to, said control element;
   f. first brake means for frictionally engaging said spool away from a drive clutch thereby braking said first spool rotation, said first brake means being selectively disengagable with said first spool and including a first frictionally engaging lever;
   g. second brake means for frictionally engaging said spool away from said drive clutch thereby braking said second spool rotation, said second brake means being selectively disengagable with said second spool and including a second frictionally engaging lever;
   h. means for driving said spools through respective clutches free of frictional engagement of said levers wherein each of said levers have one end selectively engagable with its respective spool; and selectively engageable with said brake means whereby upon operation selectively said first brake means, said second brake means and said first and said second brake means may be engaged.

2. The apparatus as claimed in claim 1 wherein each said brake means is independently engageable with its respective spool while its respective spool is engaged with said power source whereby directional control may be had of such moveable ground working implement relative to control elements during ground working implement extension from said control element.

3. A ground working implement comprising in combination:
   a. a movable ground working implement connected to a control element mounted upon ground by at least a first and a second cable, each said cable fixed at one end to said ground working implement and reeved at its respective other end upon respective first and second spools on said control element;
   b. drive means including a drive clutch plate mounted to a drive rod coaxial with each of said spools;
   c. first spool clutch plate mounted on said first spool and biased by a spring into engagement with said drive clutch plate, and spool engaging means including a first lever for frictionally engaging said first spool for disengaging said first spool clutch from said drive clutch plate upon frictional engagement with said first lever;

d. Second spool clutch plate mounted on said second spool and biased by a spring into engagement with said drive clutch plate, and spool engaging means including a second lever for frictionally engaging said second spool for disengaging said second spool clutch from said drive clutch plate upon frictional engagement with said second lever; and e. manually engagable unitary control means selectively engagable with said levers for engaging selectively said first lever, said second lever and said first and second lever.

* * * * *